(12) United States Patent
Allee

(10) Patent No.: US 8,319,191 B2
(45) Date of Patent: Nov. 27, 2012

(54) SENSOR DEVICES AND RELATED METHODS

(75) Inventor: David R. Allee, Phoenix, AZ (US)

(73) Assignee: Arizona Board of Regents, a body corporate of the State of Arizona, Acting for and on behalf of Arizona State University, Scottsdale, AZ (US)

( * ) Notice: Subject to any disclaimer, the term of this patent is extended or adjusted under 35 U.S.C. 154(b) by 0 days.

(21) Appl. No.: 13/458,728

(22) Filed: Apr. 27, 2012

(65) Prior Publication Data
US 2012/0211660 A1 Aug. 23, 2012

Related U.S. Application Data

(63) Continuation of application No. PCT/US2010/054402, filed on Oct. 28, 2010.

(60) Provisional application No. 61/256,042, filed on Oct. 29, 2009.

(51) Int. Cl.
*G01T 1/20* (2006.01)

(52) U.S. Cl. ............... 250/370.11; 250/361 R; 250/362

(58) Field of Classification Search ............. 250/361 R, 250/362, 370.01, 370.05, 370.11
See application file for complete search history.

(56) References Cited

U.S. PATENT DOCUMENTS

| | | | |
|---|---|---|---|
| 6,867,418 B2* | 3/2005 | Suzuki et al. | 250/368 |
| 2002/0079458 A1* | 6/2002 | Zur | 250/370.11 |
| 2007/0053493 A1* | 3/2007 | Bijlsma | 378/98.8 |

* cited by examiner

*Primary Examiner* — Mark R Gaworecki
(74) *Attorney, Agent, or Firm* — Bryan Cave LLP

(57) ABSTRACT

Embodiments of sensor systems and related methods of operating and manufacturing the same are described herein. The sensor systems can be used to detect atomic or subatomic particles or radiation. Other embodiments and related methods are also disclosed herein.

31 Claims, 6 Drawing Sheets

5000

5100
providing a substrate 5200
providing a photosensor over the substrate and configured to flex with the substrate 5300
providing a scintillating layer coupled to the photosensor to emit a secondary element when exposed to a primary element

6100
providing a first transistor coupled to an actuation node to set the actuation node to an actuation voltage

6200
providing a photoreactor coupled to the actuation node to alter the actuation voltage when exposed to a secondary element

6300
providing a second transistor coupled to the actuation node to generate a first signal indicative of an alteration of the actuation voltage past a first level

6400
providing a third transistor to couple the second transistor to a first read line

6500
providing a fourth transistor coupled to the actuation node to generate a second signal indicative of the alteration of the actuation voltage past a second level

6600
providing a fifth transistor to couple the fourth transistor to a second read line

7100
actuating the first transistor to reverse bias the photoreactor and set the actuation voltage to a first voltage

7200
actuating the third transistor to couple the second transistor to the first read line

7300
actuating the fourth transistor to couple the third transistor to the second read line

7400
emitting the secondary element from the scintillating layer after the scintillating layer is exposed to the primary element

7500
altering the actuation voltage via the photoreactor in response to the photoreactor's exposure to the secondary element

7600
actuating the second transistor to generate the first signal when the photoreactor alters the actuation voltage past the first level

7700
actuating the fourth transistor to generate the second signal when the photoreactor alters the actuation voltage past the second level

FIG. 6

SENSOR DEVICES AND RELATED METHODS

CROSS REFERENCE TO RELATED APPLICATION

This patent application is a continuation of International Patent Application No. PCT/US2010/054402, filed on Oct. 28, 2010, with the U.S. Receiving Office at the U.S. Patent Office, which application claims priority to U.S. Provisional Patent Application No. 61/256,042, filed on Oct. 29, 2009, with the U.S. Patent Office. The disclosures of the applications referenced above are incorporated herein by reference.

STATEMENT REGARDING FEDERAL SPONSORSHIP

At least part of the disclosure herein was funded with government support under grant number W911NF-04-2-0005, awarded by the Army Research Laboratory. The United States Government may have certain rights in this invention.

TECHNICAL FIELD

This invention relates generally to semiconductor sensor devices, and relates more particularly to sensors for the detection of radiation elements such as neutrons, and related methods.

BACKGROUND

Proper and reliable detection of hazardous materials, such as radioactive materials, can be very important to monitor and restrict unauthorized propagation thereof. These materials often tend to emit particles, waves, and or other radiation that can be detectable. However, present detection systems are unwieldy, expensive, and increasingly harder to manufacture due to dwindling raw material availability.

One particle of interest for the detection of such materials are neutrons, such as thermal neutrons in x-rays or gamma rays, which can penetrate most materials and are not easily shielded with a modest layer of lead. The neutron detector most widely used today is the pressurized $^3$He (Helium-3) tube, which was designed in the 1970s. These early gas-filled tubes or vacuum tubes that were formerly used in electronic assemblies, however, were replaced long ago by modern integrated circuits. Also, the ubiquitous cathode ray tube (CRT) is being replaced by solid-state thin-film technology (such as LCDs). Modern day helium-3 tubes are still handmade and, thus, are very costly. In addition, Helium-3 is an increasingly rare material, and may possibly be unavailable in the near future.

Accordingly, a need exists to develop sensor systems and related methods capable of replacing the obsolete and expensive detection systems described above.

BRIEF DESCRIPTION OF THE DRAWINGS

To facilitate further description of the embodiments, the following drawings are provided in which:

FIG. 4 illustrates a flowchart of a method for providing a sensor device in accordance with the present disclosure.

FIG. 5 illustrates a flowchart of a method for providing a photosensor of a sensor device, such as the sensor device of FIG. 4.

FIG. 6 illustrates a flowchart for a method for operating the sensor device of the method of FIG. 4.

Figure 1:
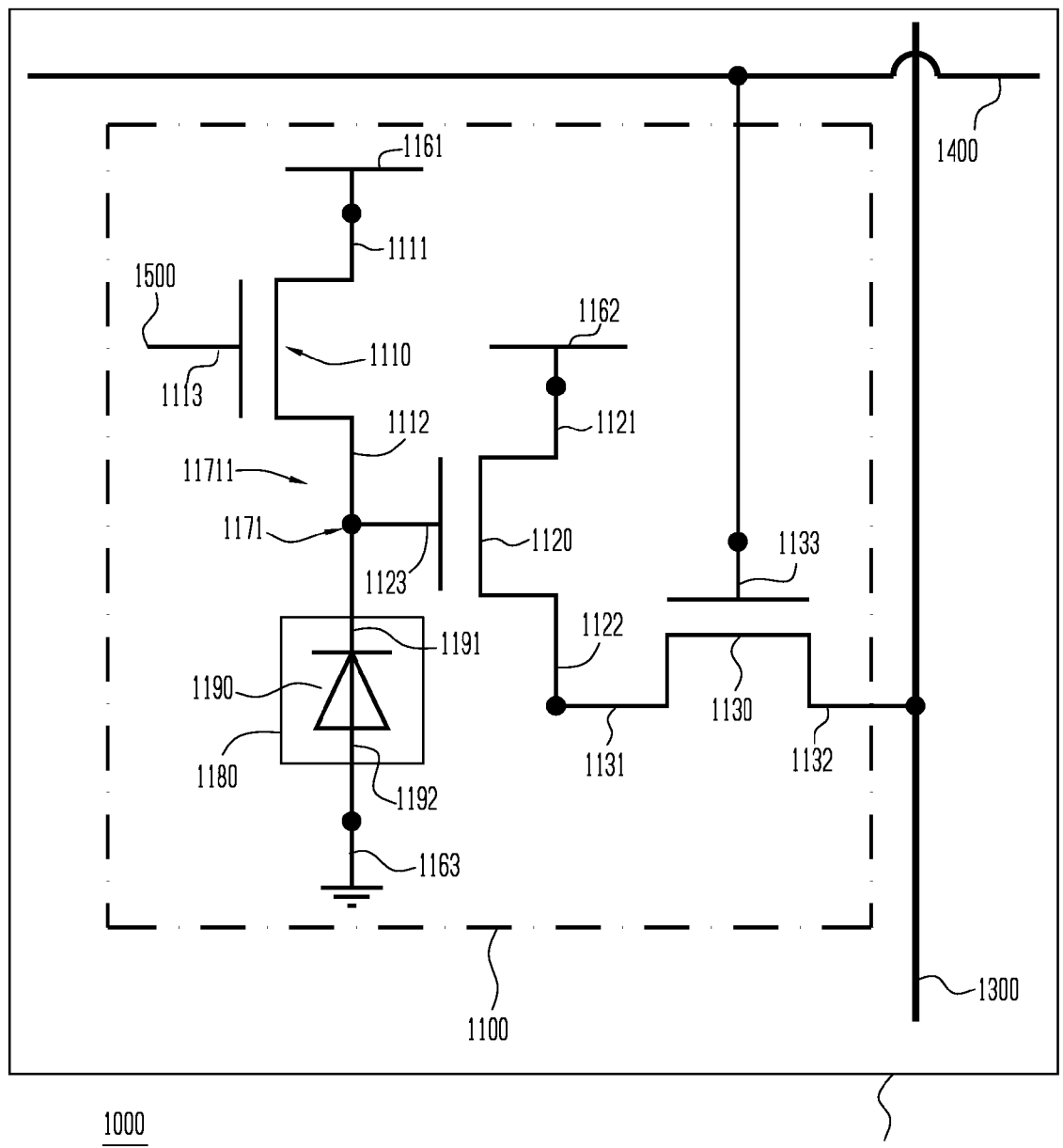
FIG. 1 illustrates a schematic of a sensor device comprising a photosensor and a scintillating layer in accordance with a first embodiment of the present disclosure.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

The terms "couple," "coupled," "couples," "coupling," and the like should be broadly understood and refer to connecting two or more elements or signals, electrically, mechanically and/or otherwise. Two or more electrical elements may be electrically coupled together but not be mechanically or otherwise coupled together; two or more mechanical elements may be mechanically coupled together, but not be electrically or otherwise coupled together; two or more electrical elements may be mechanically coupled together, but not be electrically or otherwise coupled together. Coupling may be for any length of time, e.g., permanent or semi-permanent or only for an instant.

An electrical "coupling" and the like should be broadly understood and include coupling involving any electrical signal, whether a power signal, a data signal, and/or other types or combinations of electrical signals. A mechanical "coupling" and the like should be broadly understood and include mechanical coupling of all types. The absence of the word "removably," "removable," and the like near the word "coupled," and the like does not mean that the coupling, etc. in question is or is not removable.

DESCRIPTION

In one embodiment, an apparatus includes a substrate, a photosensor over the substrate, and a scintillating layer coupled to the photosensor. The photosensor can include a photoreactor configured to react upon exposure to a secondary element; a first transistor coupled to the photoreactor; a second transistor coupled to the first transistor and to the photoreactor; and an actuation node to enable the second transistor when the photoreactor is actuated. The scintillating layer can be configured to emit the secondary element when exposed to a primary element that is incident on the scintillating layer. The apparatus can also include first, second, and third voltage nodes at the substrate and coupled to the photosensor, a first read line at the substrate and coupled to the photosensor; and a control line at the substrate and coupled to the photosensor. The first transistor can include a first terminal of the first transistor coupled to the first voltage node, a second terminal of the first transistor coupled to the actuation node; and a control terminal of the first transistor coupled to the control line. The second transistor can include a first terminal of the second transistor coupled to the second voltage node, a second terminal of the second transistor configured to couple to the first read line, and a control terminal of the second transistor coupled to the actuation node. The photoreactor can include a first terminal of the photoreactor coupled to the actuation node; and a second terminal of the photoreactor coupled to the third voltage node. There can be examples where the substrate is flexible, and the photosensor is configured to flex along with the substrate. Other variations, examples, and embodiments are described herein.

Figure 2:
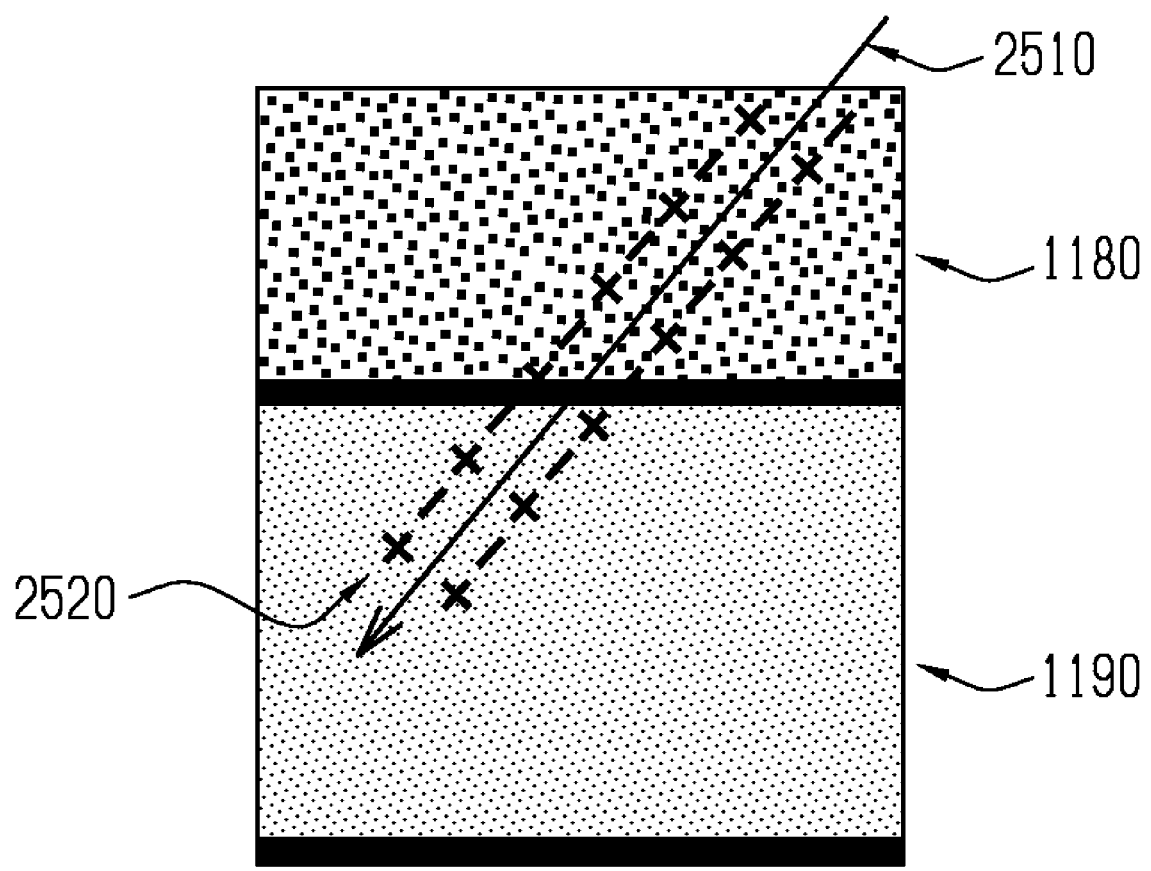
FIG. 2 illustrates a cross section of the scintillating layer coupled over a portion of a photoreactor of the photosensor.

Referring to the figures, FIG. 1 illustrates a schematic of sensor device 1000 comprising photosensor 1100 and scintillating layer 1180 in accordance with one embodiment of the present disclosure. FIG. 2 illustrates a cross section of scintillating layer 1180 coupled over a portion of photoreactor 1190. Sensor device 1000 and its components are exemplary and are not limited to the embodiments presented herein. Sensor device 1000 and its components can be implemented in other embodiments not specifically presented herein. Photosensor 1100 forms part of a pixel array of cells over substrate 1200 in the present embodiment, and comprises photoreactor 1190, transistor 1110, and transistor 1120 coupled together at actuation node 1171, and transistor 1130 coupled to transistor 1120. Sensor device 1000 can be used to detect or image the exposure of photosensor 1100, or other pixels or cells of the array, to primary elements 2510 (FIG. 2) comprising atomic or subatomic particles or radiation. In the same or a different embodiment, photosensor 1100, or other pixels or cells of the array, image or detect when one or more primary elements 2510 (FIG. 2) impacts photosensor 1100 or the other pixels or cells. There can be examples where primary elements 2510 can comprise one or more neutrons, photons, x-ray radiation, gamma ray radiation, and/or other radioactive or fissile particles. The present example of photosensor 1100 is configured to detect primary elements 2510 comprising neutron particles, such as thermal neutrons, that are incident on photosensor 1100.

In the present example, transistors 1110, 1120, and 1130 comprise thin film transistors (TFTs) in the present embodiment, and are located and/or formed over substrate 1200. In some examples, portions of transistors 1110, 1120, and/or 1130 1100, such as their respective conductive channels, can comprise an amorphous material, such as amorphous silicon, a metal oxide material, such as zinc oxide, a mixed oxide material, such as Indium/Gallium/Zinc Oxide (IGZO), a nanocrystalline material, such as nanocrystalline silicon, and/ or an organic material, such as pentacene. Although in the present example of FIGS. 1-2 transistors 1110, 1120, and 1130 are represented as NMOS transistors, there can be other similar embodiments comprising PMOS transistors and correspondingly altered polarities and connections.

As seen in FIG. 2, scintillating layer 1180 is coupled to photoreactor 1190 in the present example, and is configured to emit secondary elements 2520 when exposed to primary elements 2510. Photoreactor 1190 can comprise a p-type/ insulator/n-type (PIN) photodiode in the present example, although there can be other examples where photoreactor 1190 comprises a PN junction diode or the like. The thickness of the insulator can be tailored to the secondary element to be detected. In general, the thickness of the insulator is approximately 1-10 micrometers (μm), and the thickness of the n-type and p-type regions sandwiching the insulator are as thin as possible while maintaining good ohmic contact with the circuit.

Scintillating layer 1190 can comprise one or more materials such as a boron material like $^{10}$B, a lithium material like $^{6}$Li, and/or a gadolinium material like $^{157}$Gd in some embodiments. In the same or other embodiments, secondary elements 2520 can comprise one or more alpha or beta particles emitted by scintillating layer 1190 in reaction to being struck by or otherwise detecting primary elements 2510. Scintillating layer 1190 is located over photoreactor 1190 in the example of FIGS. 1-2, although there can be other embodiments with alternate arrangements between their respective scintillators and photoreactors. With respect to FIG. 1, although scintillating layer 1180 is shown as located over only photoreactor 1190, there can be other examples where scintillating layer 1180 can extend past a perimeter of photoreactor 1190 to cover a larger part of photosensor 1100 and/or of device 1000. In one example, scintillating layer 1180 can have a thickness of approximately 1 μm.

As will be further described below, when properly biased, photoreactor 1190 can react to the exposure to secondary particles 2520 and thereby alter the voltage of actuation node 1171 to actuate or enable transistor 1120. The embodiment of FIG. 1 also shows voltage nodes 1161-1163, control line 1500, read line 1300, and access line 1400, all at substrate 1200 and coupled to photosensor 1100. In the present example, voltage nodes 1161-1163 can be used to properly bias the different components of photoreactor 1100 for detecting secondary elements 2520, and control line 1500 can be used to reverse bias photoreactor 1190 and/or to otherwise reset actuation voltage 11711 of actuation node 1171 prior to detecting for secondary elements 2520. In the same or other examples, access line 1400 can be used to enable transistor 1130 to read from photosensor 1100, and read line 1300 can be used to read from photosensor 1100 for evidence of exposure to primary elements 2510. There can be examples where control line 1500 can be referred to as a reset line.

In the embodiment of FIG. 1, transistor 1110 of photosensor 1100 comprises terminal 1111 coupled to voltage node 1161, terminal 1112 coupled to actuation node 1171, and terminal 1113 coupled to control line 1500. Transistor 1120 of photosensor 1100 comprises terminal 1121 coupled to voltage node 1162, terminal 1122 configured to couple to read line 1300 via transistor 1130, and control terminal 1123 coupled to actuation node 1171. Transistor 1130 of photosensor 1100 comprises terminal 1131 coupled to terminal 1122 of transistor 1120, terminal 1132 coupled to read line 1300, and terminal 1133 coupled to access line 1400. Photoreactor 1190 comprises cathode terminal 1191 coupled to actuation node 1171, and anode terminal 1192 coupled to voltage node 1163. In the present example, voltage node 1163 comprises a ground node, while voltage nodes 1161 and 1162 comprise power nodes. In the same or other examples, voltage nodes 1161 and 1162 may be shorted together or may otherwise comprise the same voltage level, such as a main or "VDD" power voltage level set for sensor device 1000 or for the pixel array comprising photosensor 1100.

When operating sensor device 1000, photosensor 1100 can be set to detect primary elements 1520 by actuating transistor 1110 via control line 1500 to reverse-bias photoreactor 1900. When scintillating layer 1180 is impacted by or otherwise exposed to primary elements 2510 (FIG. 2), secondary elements 2520 (FIG. 2) are emitted by scintillating layer 1180. Such secondary elements 2520 that enter the depletion region of the reverse-biased photoreactor 1190 generate electron-hole pairs therein and partially discharge actuation node 1171. The change in charge is translated into a current by transistor 1120, acting as an amplifier, and driving down the read line 1300 for accounting when transistor 1130 is enabled via access line 1400. In some examples, the change in current from transistor 1120 can be linearly proportional to the change in stored charge within photoreactor 1190. The present active pixel sensor design for photosensor 1100 works well because the change in charge at actuation node 1171 can be applied to the small gate capacitance of transistor 1120 in photoreactor 1100, thereby actuating transistor 1120 and leading to a significant voltage change that results in a measurable current that is detectable at the end of a long column line, such as read line 1300, across a large detection pixel array. The lack of an in-pixel amplifier such as transistor 1120 would require the change in charge to be transferred and detectable over long, high capacitance, and signal-degrading column lines such as read line 1300.

In the configuration described in FIG. 1, each pixel has one amplifying transistor. Also, portions of a traditional analog-to-digital converter that is typically located at the bottom of each column of the pixel array is moved to be located inside each pixel.

In the present example, substrate 1200 comprises a flexible substrate, and transistors 1110, 1120, and 1130 are fabricated simultaneously with photoreactor 1190 over substrate 1200 via a common semiconductor process flow. Photosensor 1100 can be configured to flex along with substrate 1200, thereby providing a benefit over circuits that rely on non-flexible substrates and/or components. In the same or other examples, substrate 1200 can be a plastic substrate, and/or can comprise at least one of a flexible polyethylene naphthalate (PEN) material, such as that available from Teijin DuPont Films of Tokyo, Japan, under the tradename planarized "Teonex® Q65," a polyethylene terephthalate (PET) material, a polyethersulfone (PES) material, a polyimide, a polycarbonate, a cyclic olefin copolymer, and/or a liquid crystal polymer. In other examples, substrate 1200 can comprise other materials such as a glass material, stainless steel material, a silicon material, an iron nickel (FeNi) alloy material (e.g., FeNi, FeNi36, or Inver™; where Inver™ comprises an alloy of iron (64 percent (%)) and nickel (36%) (by weight) with some carbon and chromium), an iron nickel cobalt (FeNiCo) alloy material (e.g., Kovar™, where Kovar™ typically comprises 29% nickel, 17% cobalt, 0.2% silicon, 0.3% manganese, and 53.5% iron (by weight)), a titanium material, a tantalum material, a molybdenum material, an aluchrome material, and/or an aluminum material. In another embodiment, substrate 10 can be rigid and can comprise a semiconductor material such as silicon.

Figure 3:
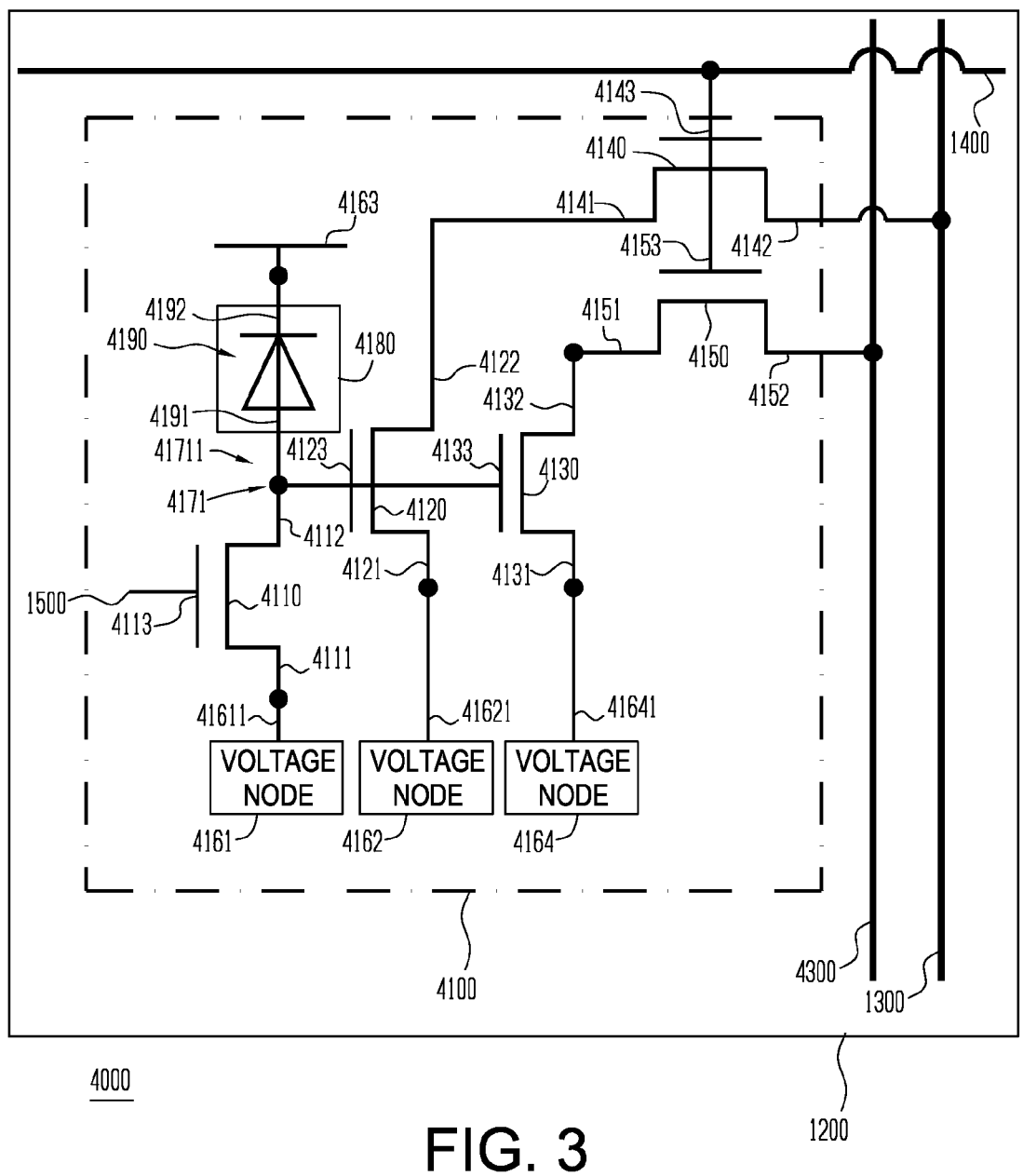
FIG. 3 illustrates a schematic of a sensor device comprising a photosensor and a scintillating layer in accordance with a second embodiment of the present disclosure.

Continuing with the figures, FIG. 3 illustrates a schematic of sensor device 4000 comprising photosensor 4100 and scintillating layer 4180 in accordance with another embodiment of the present disclosure. Sensor device 4000 and its components are exemplary and are not limited to the embodiments presented herein. Sensor device 4000 and its components can be implemented in other embodiments not specifically presented herein. Sensor device 4000 is similar to sensor device 1000 (FIG. 1), capable of detecting exposure to or impact by primary elements 2510 (FIG. 2), but comprises photosensor 4100 rather than photosensor 1100 (FIG. 1). Sensor device 4000 also comprises scintillating layer 4180, similar to scintillating layer 1180, but coupled to photosensor 4100. There can be embodiments where scintillating layer 4180 can be located at or cover a larger part of photosensor 4100 and/or of device 4000.

In the present example, sensor device 4000 is located over substrate 1200, where substrate 1200 is flexible and where sensor device 4000 can be configured to flex along with substrate 1200 in some embodiments. Photosensor 4100 comprises photoreactor 4190 and transistors 4110, 4120, 4130, 4140, and 4150 over substrate 1200 in the present example, where photoreactor 4190, transistor 4110, transistor 4130 and transistor 4120 are coupled together at actuation node 4171, where transistor 4140 is coupled to transistor 4120, and where transistor 4150 is coupled to transistor 4130. Transistor 4110 can be similar to transistor 1110 in FIG. 1, and comprises terminal 4113 coupled to control line 1500, terminal 4111 coupled to voltage node 4161, and terminal 4112 coupled to actuation node 4171. Transistor 4120 can be similar to transistor 1120 in FIG. 1, but comprises terminal 4123 coupled to actuation node 4171, terminal 4121 coupled to voltage node 4162, and terminal 4122 configured to couple to read line 1300 via transistor 4140. Photoreactor 4190 can be similar to photoreactor 1190 in FIG. 1, and comprises a photodiode in the present example with anode terminal 4191 coupled to actuation node 4171 and cathode terminal 4192 coupled to voltage node 4163. Transistor 4140 can be similar to transistor 1130 in FIG. 1, but comprises terminal 4143 coupled to access line 1400, terminal 4141 coupled to terminal 4122 of transistor 4120, and terminal 4142 coupled to read line 1300. Photosensor 4100 also comprises transistors 4130 and 4150 in the present example, where transistor 4130 can be similar to transistor 4120, and transistor 4150 can be similar to transistor 4140. Transistor 4130, however, comprises terminal 4133 coupled to actuation node 4171, terminal 4131 coupled to voltage node 4164, and terminal 4132 configured to couple to read line 4300 via transistor 4150. In addition, transistor 4150 comprises terminal 4153 coupled to access line 1400, terminal 4151 coupled to terminal 4132 of transistor 4130, and terminal 4152 coupled to read line 4300.

In the configuration of FIG. 3, similar to the configuration of FIG. 1, a portion of a traditional analog-to-digital converter is moved from the bottom of each pixel array column to be within each pixel. Unlike the configuration in FIG. 1, however, the configuration in FIG. 3 shows each pixel to have two amplifying transistors.

Similar to sensor device 1000 of FIG. 1, sensor device 4000 can be used to detect when photosensor 4100 has been exposed to primary elements 2510 (FIG. 2). In the present example, when primary elements 2510 impact scintillating layer 4180, secondary elements 2520 (FIG. 2) are emitted by scintillating layer 4190 to impact photoreactor 4190, and photoreactor 4190 reacts by altering actuation voltage 41711 of actuation node 4171. In the present example, photoreactor 4190 can alter actuation voltage 41711 due to the creation of electron-hole pairs resulting from secondary elements 2520 (FIG. 2) incident on the depletion region of the reverse-biased photoreactor 4190, where hole carriers of the electron-hole pairs can accumulate at anode terminal 4191 to thereby raise actuation voltage 41711 at actuation node 4171.

Photosensor 4100 further permits the determination of an energy level corresponding to the energy of primary elements 2510 (FIG. 2) to which photosensor 4100 is exposed. For example, in the present embodiment of FIG. 3, an energy level of primary elements 2510 incident on scintillating layer 4180 at photosensor 4100 can be correlated to an energy level of secondary elements 2520 (FIG. 2) emitted by scintillating layer 4180 when exposed to primary elements 2510. In similar fashion, the energy level of secondary elements 2520 can be correlated to a voltage level for actuation voltage 41711 at actuation node 4171 after actuation voltage 41711 has been altered by photoreactor 4190 in reaction to the exposure to secondary elements 2520.

In light of the above, the energy level of the primary elements to which photosensor 4100 has been exposed to can be determined by properly biasing the different elements of photosensor 4100 with appropriate voltages. In the present example, voltage node 4161 comprises voltage 41611, and voltage node 4162 comprises voltage 41621 greater than voltage 41611. Also, voltage node 4164 comprises voltage 41641 greater than voltage 41621 of voltage node 4162. Voltage node 4163 comprises voltage 41631 to reverse-bias photoreactor 4190 in the present example, and is greater than voltage 41611 of voltage node 4161. In some examples, voltage 41631 can comprise a main or "VDD" power voltage level for sensor device 4000 and/or for the pixel array comprising photosensor 4100.

Because of the biasing of voltages described above, photoreactor 4190 will be reverse-biased, and actuation voltage 41711 at actuation node 4171 will be set to voltage 41611 of voltage node 4161, when control line 1500 actuates transistor 4110 to thereby "reset" photosensor 4100 for detecting primary elements 2510. In addition, again due to the biasing of voltages described above, a turn-on voltage for transistor 4120 is greater than voltage 41611, and a turn-on voltage for transistor 4130 is greater than the turn-on voltage for transistor 4120.

In the present example, the turn-on voltage for transistor 4120 comprises a threshold voltage of transistor 4120 plus voltage 41621. Similarly, the turn-on voltage for transistor 4130 comprises a threshold voltage of transistor 4130 plus voltage 41641. Assuming that transistor 4140 is enabled by access line 1400, if actuation voltage 41711 is altered by photoreactor 4190 past the turn-on voltage of transistor 4120, transistor 4120 will be enabled by actuation node 4171 to couple read line 1300 with voltage node 4162 to thereby set read line 1300 at voltage 41621. Similarly, assuming that transistor 4150 is enabled by access line 1400, if actuation voltage 41711 is altered by photoreactor 4190 past the even higher turn-on voltage of transistor 4130, transistor 4130 will be enabled by actuation node 4171 to couple read line 4300 with voltage node 4164 to thereby set read line 4300 at the higher voltage of voltage 41641.

Such differences in the turn-on voltages of transistors 4120 and 4130, based on the biasing of voltage nodes 4161-4163, permits the discernment of the energy level of primary elements 2510 incident on photosensor 4100, as correlated to the alteration of actuation voltage 41711, by monitoring read lines 1300 and 4300.

For example, if read line 4300 remains decoupled from voltage node 4164, while read line 1300 is coupled to voltage node 4162, then the energy level of primary elements 2510 incident on photosensor 4100 can be correlated to a first energy level range corresponding to an alteration of actuation voltage 4171 to a value between the turn-on voltage for transistor 4120 and the turn-on voltage for transistor 4130.

Similarly, if read line 4300 is coupled to voltage node 4164, and read line 1300 is coupled to voltage node 4162, then the energy level of primary elements 2510 incident on photosensor 4100 can be correlated to a second energy level range corresponding to an alteration of actuation voltage 4171 to a value past the turn-on voltage for transistor 4130.

In addition, if both read lines 1300 and 4300 remain decoupled from voltage nodes 4162 and 4162, respectively, then the energy level of any primary elements 2150 incident on photosensor 4100 would be correlated to an energy level range corresponding to an unaltered actuation voltage 41711 at a value less than the turn-on voltage for transistor 4120.

There can also be other embodiments capable of discerning further energy levels for primary elements 2510. For example, another transistor pair similar to transistors 4120 and 4130 can be added, biased at a voltage greater than voltage 41641, and coupled to a third read line similar to read line 4300. In another embodiment, such as for situations where less resolution is needed, transistors 4130 and 4140 could be removed along with read line 4300, thereby limiting the sensitivity of photosensor 4100 to discern a first energy level range from the second energy level range.

There can also be examples where, before each measurement iteration, read lines 1300 and 4300 can be pre-set to a precharge voltage. For example, read lines 1300 and 4300 can be precharged to "VDD" when photoreactor 4190 is reverse biased by the actuation of transistor 4110. In such an example, read lines 1300 and 4300 can then be respectively discharged to voltage nodes 4162 via transistor 4120 and to voltage node 4163 via transistor 4130.

Continuing with the figures, FIG. 4 illustrates a flowchart of method 5000 for providing a sensor device in accordance with the present disclosure. In some embodiments, the sensor device of method 5000 can be similar to sensor device 1000 (FIG. 1), sensor device 4000 (FIG. 3), or other variations thereof.

Block 5100 of method 5000 comprises providing a substrate. In some examples, the substrate of method 5000 can be similar to flexible substrate 1200 as described above for FIGS. 1-4. For example, the substrate can comprise a plastic material such as polyethylene naphthalate suitable for the formation of semiconductor devices thereon. In other embodiments, the substrate need not be flexible.

Block 5200 of method 5000 comprises providing a photosensor over the substrate. In some examples, the photosensor of method 5000 can be similar to photosensor 1100 (FIG. 1) to photosensor 4100 (FIG. 3), or to variations thereof. In the same or other examples, the photosensor can be configured or designed to flex along with the substrate of block 5100. The photosensor may be formed or fabricated over the substrate in some embodiments. There can be other embodiments, however, where at least a portion of the photosensor may be placed over the substrate in the form of a dice, such as a bare dice thinned or otherwise configured for flexing with the substrate. In other embodiments, where the substrate of block 5100 is not flexible, the photosensor of block 5200 need not be flexible. There can also be examples where the photosensor of block 5200 comprises an element of an array, such as a pixel array, over the substrate of block 5100. Block 5200 can comprise several steps in some examples, as described below for method 6000.

Block 5300 of method 5000 comprises providing a scintillating layer coupled to the photosensor to emit a secondary element when exposed to a primary element. In some examples, the scintillating layer can be similar to scintillating layer 1180 (FIGS. 1-2) or to scintillating layer 4180 (FIG. 3). Similarly, the primary and secondary elements can be respectively similar to primary and secondary elements 2510 and 2520, as illustrated in FIGS. 2-3, and as described above for FIGS. 1-4.

Forging ahead, FIG. 5 illustrates a flowchart of a method 6000 for providing a photosensor of a sensor device. In some examples, the photosensor of method 6000 can be similar to photosensor 1100 (FIG. 1), photosensor 4100 (FIG. 3), or variations thereof. In the same or other examples, method 6000 can comprise one or more steps of block 5200 of method 5000 (FIG. 4).

Block 6100 of method 6000 comprises providing a first transistor coupled to an actuation node to set the actuation node to an actuation voltage. In one embodiment, the first transistor can be similar to transistor 1110 coupled between voltage node 1161 and actuation node 1171 (FIG. 1). In another embodiment, the first transistor can be similar to transistor 4110, and the actuation node can be similar to actuation node 4171 (FIG. 3). In some examples, the first transistor can be used to "reset" the photosensor prior to measuring or scanning for exposure to primary elements.

Block 6200 of method 6000 comprises providing a photoreactor coupled to the actuation node of block 6100 to alter the actuation voltage when exposed to a secondary element. There can be examples where the photoreactor can comprise a photodiode. In one embodiment, the photoreactor can be similar to photoreactor 1190 and configured to alter actuation voltage 11711 (FIG. 1). In another embodiment, the photoreactor can be similar to photoreactor 4190 and configured to alter actuation voltage 41711 (FIG. 3).

In the same or other embodiments, the first transistor of block 6100 can be used to set the photoreactor of block 6200 in a reversed-biased state by coupling the actuation node to a first voltage node when the first transistor is actuated by a control line. As an example, transistor 1110 can be actuated by control line 1500 to reverse bias photoreactor 1190 by setting actuation node 1171 at the voltage of voltage node 1161 (FIG. 1). In another example, transistor 4110 can reverse bias photoreactor 4190 by actuation voltage 41711 at the voltage of voltage node 4163 (FIG. 3).

Block 6300 of method 6000 comprises providing a second transistor coupled to the actuation node to generate a first signal indicative of an alteration of the actuation voltage past a first level. In some examples, the first level can correspond to a first predetermined voltage at a second voltage node to which the second transistor is coupled. In one example, the second transistor can be similar to transistor 1120, and the first signal can correspond to a value of voltage node 1162 when transistor 1120 is actuated via actuation node 1171 (FIG. 1). In another example, the second transistor can be similar to transistor 4120, and the first signal and/or the first level can correspond to voltage 41621 at voltage node 4162 (FIG. 3) when transistor 4120 is actuated via actuation node 4171.

Block 6400 of method 6000 comprises providing a third transistor to couple the second transistor to a first read line. In one example, the third transistor can be similar to transistor 1133, configured to couple transistor 1120 to read line 1300 to set read line 1300 at the value of voltage node 1162 (FIG. 1) under certain conditions. In another example, the third transistor can be similar to transistor 4140, configured to couple transistor 4120 to read line 1300 to set read line 1300 at voltage 41621 (FIG. 3) under certain conditions.

Block 6500 of method 6000 comprises providing a fourth transistor coupled to the actuation node to generate a second signal indicative of an alteration of the actuation voltage past a second level. In some examples, the second level can correspond to a second predetermined voltage at a third voltage node to which the fourth transistor is coupled. As an example, the fourth transistor can be similar to transistor 4130, and the second signal and/or the second level can correspond to voltage 41641 at voltage node 4164 (FIG. 3) when transistor 4130 is actuated via actuation node 4171.

Block 6600 of method 6000 comprises providing a fifth transistor to couple the fourth transistor to a second read line. As an example, the fifth transistor can be similar to transistor 4150, configured to couple transistor 4130 to read line 4300 to set read line 4300 at voltage 41641 (FIG. 3) under certain conditions.

Moving on, FIG. 6 illustrates a flowchart for a method 7000 for operating the sensor device of method 5000 (FIG. 4) having the photosensor of method 6000 (FIG. 5).

Block 7100 of method 7000 comprises actuating the first transistor of the photosensor to reverse bias the photoreactor of the photosensor and set the actuation voltage to a first voltage. In some examples, the first transistor can be similar to the first transistor of block 6100 of method 6000 (FIG. 5), and the photoreactor can be similar to the photoreactor of block 6200 of method 6000 (FIG. 5). In the same or other examples, the first voltage can be similar to the value at the first voltage node described above for block 6100 of method 6000 (FIG. 5). The first transistor can be actuated via a control line such as control line 1500 (FIGS. 1 and 4).

There can be examples where block 7100 can also comprise setting a second voltage node at a second voltage greater than the first voltage, where the second voltage node can be similar to the second voltage node described above with respect to block 6300 of method 6000. In the same or other examples, block 7100 can also comprise setting a third voltage node at a third voltage greater than the second voltage, where the third voltage node can be similar to the third voltage node described above with respect to block 6500 of method 6000.

Block 7200 of method 7000 comprises actuating the third transistor of block 6400 to couple the second transistor of block 6300 to the first read line (method 6000, FIG. 5). Similarly, block 7300 of method 7000 comprises actuating the fifth transistor of block 6600 to couple the fourth transistor of block 6500 to the second read line (method 6000, FIG. 5). The third and fifth transistors can be actuated in some examples via an access line similar to access line 1400 (FIGS. 1, 4).

Block 7400 of method 7000 comprises emitting the secondary element from the scintillating layer of block 5300 after the scintillating layer is exposed to the primary element described for block 5300 (method 5000, FIG. 4).

Block 7500 of method 7000 comprises altering the actuation voltage via the photoreactor when the photoreactor is exposed to the secondary element. In some examples, block 7500 can be carried out as a result of charge accumulation at a terminal of the photoreactor coupled to the actuation node, where the charge accumulation can be the result of a generation of electron-hole pairs when the photoreactor is exposed to the secondary element. In the same or other examples, hole carriers from the electron-hole pairs can be collected at the anode of the photoreactor proximate to the actuation node.

Block 7600 comprises actuating the second transistor of block 6300 to generate the first signal when the photoreactor alters the actuation voltage past the first level described for block 6300 (method 6000, FIG. 5). Similarly, Block 7700 comprises actuating the fourth transistor of block 6500 to generate the second signal when the photoreactor alters the actuation voltage past the second level described for block 6500 (method 6000, FIG. 5).

In some embodiments, the first or second signals can be readable via read lines 1300 (FIG. 1) or 4300 (FIG. 3), respectively, via comparators coupled to the first and second read lines to detect changes in their respective voltages. In the same or other embodiments, the first or second read lines can be precharged to a precharge voltage level before block 7600. In such examples, the first read line can be discharged via the second transistor, from the precharge voltage to the second voltage described for block 7100, when block 7600 is carried out. Similarly, the second read line can be discharged via the fourth transistor, from the precharge voltage to the third voltage described for block 7100, when block 7700 is carried out. In the same or other examples, the first predetermined voltage can comprise a threshold voltage of the second transistor, plus the second voltage described for block 7100. Similarly, the second predetermined voltage can comprise a threshold voltage of the third transistor plus the third voltage described for block 7100.

In some examples, one or more of the different blocks of methods 5000, 6000, or 7000 can be combined into a single step. For example, blocks 5200 and 5300 can be performed simultaneously in some embodiments. As another example, the several or all of the transistors and/or the photoreactor in method 6000 could be fabricated over the substrate using a semiconductor manufacturing process, such that some or all of blocks 6100, 6200, 6300, 6400, 6500, and/or 6600 could be carried out simultaneously and/or as a single step. Furthermore, in method 7000, block 7200 and 7300 could be performed simultaneously or could be combined in a single step in one example if both the first and third transistors are actuated simultaneously via a common access line, such as access line 1400 (FIGS. 1, 4).

There can also be embodiments where the sequence of one or more of the different blocks of methods 5000, 6000, or 7000 can be changed, or where some of the blocks are omitted. As an example, the sequence of blocks 6200 and 6100 in method can be reversed if desired in some examples. As another example, blocks 7200 and/or 7300 could be carried out before block 7100 in method 7000. Additionally, blocks 6500 and 6600 and/or blocks 7300 and 7700 can be omitted in other examples.

Some examples of methods 5000, 6000, or 7000 can also comprise further or different steps. For instance, method 5000 can comprise another block for operating the sensor device, where such block could comprise one or more of the steps in method 7000 in some examples. As another example, method 6000 could comprise another step for providing a comparator coupled to the first or second read lines. Similarly, method 7000 cold comprise another step for monitoring a voltage or charge level of the first or second read lines with a comparator to thereby determine whether the first or second signals have been generated.

Although the sensor devices and related methods have been described herein with reference to specific embodiments, various changes or additions may be made without departing from the spirit or scope of the disclosure. For instance, the sensor devices described herein may be part of a larger system or device that encompasses further functionality besides sensing for primary elements. As an example, sensor devices 1000 (FIG. 1) and/or 4000 (FIG. 3) may be coupled to a display over substrate 1200, where the display and the sensor device may be formed over substrate 1200 using the same semiconductor process flow or portions thereof. There can also be examples with variations of sensor devices 1000 (FIG. 1) and/or 4000 (FIG. 3) based on PMOS transistors, or with CMOS circuitry, rather than the NMOS configurations depicted in FIGS. 1 and 4. In such embodiments, biasing voltages and other connections or relationships may need to be adjusted to account for the resulting altered or opposite logic. Additional examples of such changes have been given in the foregoing description.

Accordingly, the disclosure of embodiments is intended to be illustrative of the scope of the invention and is not intended to be limiting. It is intended that the scope of this application shall be limited only to the extent required by the appended claims. The sensor devices and related methods discussed herein may be implemented in a variety of embodiments, and the foregoing discussion of certain of these embodiments does not necessarily represent a complete description of all possible embodiments. Rather, the detailed description of the drawings, and the drawings themselves, disclose at least one preferred embodiment, and may disclose alternative embodiments.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. An apparatus comprising:
a substrate;
a photosensor over the substrate and comprising:
   a photoreactor configured to react upon exposure to a secondary element;
   a first transistor coupled to the photoreactor;
   a second transistor coupled to the first transistor and to the photoreactor; and
   an actuation node for an actuation voltage; and
a scintillating layer coupled to the photosensor to emit the secondary element when exposed to a primary element that is incident on the scintillating layer;
wherein the actuation node is configured to enable the second transistor when the photoreactor reacts to the secondary element.

2. The apparatus of claim 1, wherein:
the scintillating layer is located over the photoreactor.

3. The apparatus of claim 1, wherein:
the scintillating layer extends past a perimeter of the photoreactor.

4. The apparatus of claim 1, wherein:
at least one of the first or second transistors comprises a thin film transistor; and
the photoreactor comprises a photodiode comprising at least one of:
   a PN junction diode; or
   a PIN diode.

5. The apparatus of claim 1, wherein:
the scintillating layer comprises at least one of:
   a boron $^{10}$B material;
   a lithium $^{6}$Li material; or
   a gadolinium $^{157}$Gd material.

6. The apparatus of claim 1, wherein:
the secondary element comprises at least one of:
   one or more alpha particles; or
   one or more beta particles; and the primary element comprises at least one of:
  one or more neutrons;
  one or more photons;
  an x-ray radiation;
  a gamma ray radiation; or
  one or more radioactive particles.

7. The apparatus of claim 1, further comprising:
first, second, and third voltage nodes at the substrate and coupled to the photosensor;
a first read line at the substrate and coupled to the photosensor; and
a control line at the substrate and coupled to the photosensor;
wherein:
  the first transistor comprises:
    a first terminal of the first transistor coupled to the first voltage node;
    a second terminal of the first transistor coupled to the actuation node; and
    a control terminal of the first transistor coupled to the control line;
  the second transistor comprises:
    a first terminal of the second transistor coupled to the second voltage node;
    a second terminal of the second transistor configured to couple to the first read line; and
    a control terminal of the second transistor coupled to the actuation node; and
  the photoreactor comprises:
    a first terminal of the photoreactor coupled to the actuation node; and
    a second terminal of the photoreactor coupled to the third voltage node.

8. The apparatus of claim 7, wherein:
at least two of the first, second, or third voltage nodes are coupled together as a single voltage node.

9. The apparatus of claim 7, further comprising:
a first access line at the substrate and coupled to the photosensor;
wherein:
  the photosensor further comprises:
    a third transistor comprising:
      a first terminal of the third transistor coupled to the second terminal of the second transistor;
      a second terminal of the third transistor coupled to the first read line; and
      a control terminal of the third transistor coupled to the first access line; and
  the second terminal of the second transistor is coupled to the first read line through the third transistor.

10. The apparatus of claim 7, wherein:
the photoreactor comprises a photodiode;
the first terminal of the photoreactor comprises a cathode terminal of the photodiode;
the second terminal of the photoreactor comprises an anode terminal of the photodiode;
the first voltage node comprises a first power node;
the second voltage node comprises a second power node; and
the third voltage node comprises a ground node.

11. The apparatus of claim 7, further comprising:
a second read line at the substrate and coupled to the photosensor; and
a fourth voltage node at the substrate and coupled to the photosensor;
wherein the photosensor further comprises:
  a third transistor comprising:
    a first terminal of the third transistor coupled to the fourth voltage node;
    a second terminal of the third transistor configured to couple to the second read line; and
    a control terminal of the third transistor coupled to the actuation node.

12. The apparatus of claim 11, further comprising:
a first access line at the substrate and coupled to the photosensor;
wherein the photosensor further comprises:
  a fourth transistor comprising:
    a first terminal of the fourth transistor coupled to the second terminal of the second transistor;
    a second terminal of the fourth transistor coupled to the first read line; and
    a control terminal of the fourth transistor coupled to the first access line; and
  a fifth transistor comprising:
    a first terminal of the fifth transistor coupled to the second terminal of the third transistor;
    a second terminal of the fifth transistor coupled to the second read line; and
    a control terminal of the fifth transistor coupled to the first access line.

13. The apparatus of claim 11, wherein:
the photoreactor comprises a photodiode;
the first terminal of the photoreactor comprises an anode terminal of the photodiode; and
the second terminal of the photoreactor comprises a cathode terminal of the photodiode.

14. The apparatus of claim 11, wherein:
the first voltage node comprises a first voltage;
the second voltage node comprises a second voltage;
the third voltage node comprises a third voltage greater than the first voltage; and
the fourth voltage node comprises a fourth voltage greater than the second voltage.

15. The apparatus of claim 14, wherein:
a turn-on voltage for the second transistor is greater than the first voltage of the first voltage node; and
a turn-on voltage for the third transistor is greater than the turn-on voltage for the second transistor.

16. The apparatus of claim 14, wherein:
when the first transistor is actuated by the control line:
  the photoreactor is reverse biased; and
  the actuation voltage is set to the first voltage.

17. The apparatus of claim 14, wherein:
the actuation node comprises an actuation voltage;
the actuation voltage is alterable when the photoreactor is actuated by the secondary element;
the second transistor is actuated to set the first read line to the second voltage when the actuation voltage is altered to exceed the second voltage plus a threshold voltage of the second transistor; and
the fourth transistor is actuated to set the second read line to the fourth voltage when the actuation voltage is altered to exceed the fourth voltage plus a threshold voltage of the third transistor.

18. The apparatus of claim 11, wherein:
the actuation node comprises an actuation voltage;
an energy level of the primary element is correlated to an energy level of the secondary element;
the energy level of the secondary element is correlated to a voltage level of the actuation node;

when the first read line is coupled to the second voltage node and the second read line is decoupled from the fourth voltage node, the energy level of the primary element is correlated to a first energy level range; and when the first read line is coupled to the second voltage node and the second read line is coupled to the fourth voltage node, the energy level of the primary element is correlated to a second energy level range different from the first energy level range.

19. The apparatus of claim 1, wherein:
the substrate is flexible; and
the photosensor is configured to flex along with the substrate.

20. A method comprising:
providing a substrate;
providing a photosensor over the substrate; and
providing a scintillating layer coupled to the photosensor; wherein:
   providing the scintillating layer comprises:
      providing the scintillating layer to emit a secondary element when exposed to a primary element that is incident on the scintillating layer; and
   providing the photosensor comprises:
      providing a first transistor coupled to an actuation node to reset an actuation voltage of an actuation node;
      providing a photoreactor over the substrate and coupled to the actuation node to alter the actuation voltage when exposed to the secondary element;
      providing a second transistor coupled to the actuation node and configured to be enabled when the actuation voltage is altered by the photoreactor; and
      providing a third transistor to couple the second transistor to a first read line.

21. The method of claim 20, wherein:
providing the first transistor comprises:
   coupling the first transistor to a first voltage node; and
   configuring the first transistor to couple the actuation node to the first voltage node when actuated by a control line;
providing the photoreactor comprises:
   providing the photoreactor to comprise a photodiode;
   providing a cathode of the photodiode coupled to the actuation node;
   providing an anode of the photodiode coupled to a ground node; and
   configuring the photodiode to be reverse biased when the first transistor is actuated; and
providing the second transistor comprises:
   coupling the second transistor to a second voltage node; and
   configuring the second transistor to couple the second voltage node to the first read line via the third transistor when the second transistor is enabled by the photoreactor.

22. The method of claim 20, wherein:
providing the second transistor further comprises:
   configuring the second transistor to be enabled when the photoreactor alters the actuation voltage past a first predetermined voltage; and
providing the photosensor further comprises:
   providing a fourth transistor coupled to the actuation node and configured to be enabled when the actuation voltage is altered by the photoreactor past a second predetermined voltage greater than the first predetermined voltage; and
   providing a fifth transistor to couple the fourth transistor to a second read line.

23. The method of claim 22, wherein:
providing the first transistor comprises:
   coupling the first transistor to a first voltage node; and
   configuring the first transistor to couple the actuation node to the first voltage node when actuated by a control line;
providing the photoreactor comprises:
   providing the photoreactor to comprise a photodiode;
   providing a cathode of the photodiode coupled to a power node;
   providing an anode of the photodiode coupled to the actuation node; and
   configuring the photodiode to be reverse biased when the first transistor is actuated;
providing the second transistor comprises:
   coupling the second transistor to a second voltage node; and
   configuring the second transistor to couple the second voltage node to the first read line via the third transistor when the second transistor is enabled by the photoreactor; and
providing the fourth transistor comprises:
   coupling the fourth transistor to a third voltage node; and
   configuring the fourth transistor to couple the third voltage node to the second read line via the fifth transistor when the fourth transistor is enabled by the photoreactor.

24. The method of claim 23, further comprising:
operating the photosensor to detect when the primary element is incident on the scintillating layer;
wherein operating the photosensor comprises:
   setting the first voltage node at a first voltage;
   setting the power voltage node at a power voltage greater than the first voltage;
   setting the second voltage node at a second voltage;
   setting the third voltage node at a third voltage greater than the second voltage;
   actuating the first transistor via the control line to:
      reverse bias the photoreactor; and
      set the actuation voltage at the actuation node to the first voltage;
   actuating the third transistor to couple the second transistor to the first read line;
   actuating the fifth transistor to couple the fourth transistor to the second read line;
   emitting the secondary element from the scintillating layer after the scintillating layer is exposed to the primary element; and
   actuating at least one of the second or fourth transistors when the photoreactor alters the actuation voltage past the first predetermined voltage after the scintillating layer is exposed to the primary element.

25. The method of claim 24, wherein:
operating the photosensor further comprises:
- precharging the first and second read lines to a precharge voltage before actuating the at least one of the second or fourth transistors;
- discharging the first read line via the second transistor, from the precharge voltage to the second voltage, when the actuation voltage is altered by the photoreactor past the first predetermined voltage; and
- discharging the second read line via the fourth transistor, from the precharge voltage to the third voltage, when the actuation voltage is altered by the photoreactor past the second predetermined voltage;

the first predetermined voltage comprises:
- a threshold voltage of the second transistor plus the second voltage; and the second predetermined voltage comprises:
- a threshold voltage of the fourth transistor plus the third voltage.

26. The method of claim 24, wherein:
actuating the at least one of the second or fourth transistors comprises:
- generating one or more electron hole pairs in the photodiode when the photoreactor is exposed to the secondary element; and
- collecting one or more holes of the electron hole pairs at the anode of the photodiode to alter the actuation voltage at the first voltage node.

27. The method of claim 20, wherein:
providing the photoreactor comprises:
- providing a photodiode comprising at least one of:
  - a PN junction diode; or
  - a PIN diode;

providing the scintillating layer comprises:
- providing the scintillating layer to comprise at least one of:
  - a boron $^{10}$B material;
  - a lithium $^{6}$Li material; or
  - a gadolinium $^{157}$Gd material;

the secondary element comprises at least one of:
- one or more alpha particles; or
- one or more beta particles; and the primary element comprises at least one of:
- one or more neutrons;
- one or more photons;
- an x-ray radiation;
- a gamma ray radiation; or
- one or more radioactive particles.

28. The method of claim 20, wherein:
providing the substrate comprises:
- providing a flexible substrate; and providing the photosensor comprises:
- providing the photosensor to flex with the flexible substrate.

29. An apparatus comprising:
a substrate;
a scintillating layer over the substrate to emit a secondary element upon exposure to a primary element that is incident on the scintillating layer;
a photosensor over the substrate and comprising:
- an actuation node at the substrate and configured to comprise an actuation voltage;
- a photodiode coupled to the actuation node and reactive to the secondary element to alter the actuation voltage;
- first, second, and third transistors coupled to the actuation node;
- a fourth transistor coupled to the second transistor; and
- a fifth transistor coupled to the third transistor;

first, second, third, and fourth voltage nodes at the substrate and coupled to the photosensor;
first and second read lines at the substrate and coupled to the photosensor;
an access line at the substrate and coupled to the photosensor; and
a reset line at the substrate and coupled to the photosensor;

wherein:
the scintillating layer is coupled over at least a portion of the photosensor;

the first transistor comprises:
- a first terminal of the first transistor coupled to the first voltage node;
- a second terminal of the first transistor coupled to the actuation node; and
- a control terminal of the first transistor coupled to the reset line;

the second transistor comprises:
- a first terminal of the second transistor coupled to the second voltage node;
- a second terminal of the second transistor coupled to the fourth transistor; and
- a control terminal of the second transistor coupled to the actuation node;

the third transistor comprises:
- a first terminal of the third transistor coupled to the fourth voltage node;
- a second terminal of the third transistor coupled to the fifth transistor; and
- a control terminal of the third transistor coupled to the actuation node;

the photodiode comprises:
- an anode of the photodiode coupled to the actuation node; and
- a second terminal of the photodiode coupled to the third voltage node;

the fourth transistor comprises:
- a first terminal of the fourth transistor coupled to the second terminal of the second transistor;
- a second terminal of the fourth transistor coupled to the first read line; and
- a control terminal of the fourth transistor coupled to the access line;

a fifth transistor comprises:
- a first terminal of the fifth transistor coupled to the second terminal of the third transistor;
- a second terminal of the fifth transistor coupled to the second read line; and
- a control terminal of the fifth transistor coupled to the first access line;

the first read line is dischargeable from a precharge voltage, via the fourth and second transistors to the second voltage node, when the actuation voltage is altered by the photodiode to exceed a turn-on voltage of the second transistor; and the second read line is dischargeable from the precharge voltage, via the fifth and third transistors to the fourth voltage node, when the actuation voltage is altered by the photodiode to exceed a turn-on voltage of the third transistor.

30. The apparatus of claim 29, wherein:
the first voltage node comprises a first voltage;
the second voltage node comprises a second voltage greater than the first voltage;
the third voltage node comprises a third voltage greater than the first voltage;
the fourth voltage node comprises a fourth voltage greater than the second voltage;
the turn-on voltage of the second transistor is greater than the first voltage of the first voltage node;
the turn-on voltage of the fourth transistor is greater than the turn-on voltage of the second transistor;
the secondary element comprises one or more alpha particles;
the primary element comprises one or more neutrons; and
the scintillating layer comprises at least one of:
a boron $^{10}$B material;
a lithium $^{6}$Li material; or
a gadolinium $^{157}$Gd material.

31. The apparatus of claim 29, wherein:
the substrate is flexible;
the photosensor and the scintillating layer are configured to flex with the substrate; and
the first, second, third, fourth, and fifth transistors comprise thin film transistors.

* * * * *